(12) United States Patent
Tanaka

(10) Patent No.: US 7,196,765 B2
(45) Date of Patent: Mar. 27, 2007

(54) LIQUID CRYSTAL DEVICE AND ELECTRONIC APPARATUS, AND METHOD FOR FABRICATING LIQUID CRYSTAL DEVICE

(75) Inventor: Takaaki Tanaka, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 224 days.

(21) Appl. No.: 10/982,972

(22) Filed: Nov. 8, 2004

(65) Prior Publication Data

US 2005/0122466 A1    Jun. 9, 2005

(30) Foreign Application Priority Data

Nov. 21, 2003   (JP)   ............... 2003-392184

(51) Int. Cl.
*G02F 1/1339*   (2006.01)
*G02F 1/1337*   (2006.01)

(52) U.S. Cl. ...................... 349/154; 349/130

(58) Field of Classification Search ........... 349/154, 349/124, 125; 428/1.32, 1.23, 1.52
See application file for complete search history.

(56) References Cited

U.S. PATENT DOCUMENTS

| | | | |
|---|---|---|---|
| 5,109,293 A * | 4/1992 | Matsunaga et al. | 349/189 |
| 5,798,813 A | 8/1998 | Ohashi et al. | |
| 6,940,576 B2 * | 9/2005 | Imayama et al. | 349/153 |

FOREIGN PATENT DOCUMENTS

| | | |
|---|---|---|
| JP | A-02-226115 | 9/1990 |
| JP | A 5-27211 | 2/1993 |
| JP | U-05-059429 | 8/1993 |
| JP | A 6-289407 | 10/1994 |
| JP | A-08-095069 | 4/1996 |
| JP | A-09-146106 | 6/1997 |
| JP | B2 2769060 | 4/1998 |
| JP | A-11-014990 | 1/1999 |
| JP | A-2000-075308 | 3/2000 |
| JP | A 2000-137202 | 5/2000 |
| KR | A-2002-0057812 | 7/2002 |
| KR | A-2002-0073396 | 9/2002 |

* cited by examiner

Primary Examiner—James A. Dudek
(74) Attorney, Agent, or Firm—Oliff & Berridge, PLC

(57) ABSTRACT

Exemplary embodiments of the invention provide a new structure to reduce alignment defects caused by a problem inherent in an alignment layer without changing the alignment layer itself. According to exemplary embodiments of the present invention, in a method for fabricating a liquid crystal device, the liquid crystal device has a pair of substrates, liquid crystal therebetween, and an alignment layer at least on the inner surface of the substrate. The alignment layer is in contact with the liquid crystal. The method includes forming an alignment layer including inorganic columnar structures tilted towards a predetermined direction on the substrate and filling a space between the pair of substrates with the liquid crystal. In filling, the liquid crystal is filled so as to flow on the alignment layer in a direction parallel to the predetermined direction.

4 Claims, 8 Drawing Sheets

LIQUID CRYSTAL DEVICE AND ELECTRONIC APPARATUS, AND METHOD FOR FABRICATING LIQUID CRYSTAL DEVICE

BACKGROUND OF THE INVENTION

1. Field of Invention

Exemplary embodiments of the present invention relate to a method for fabricating a liquid crystal device, a liquid crystal device and an electronic apparatus. Exemplary embodiments relate to a liquid crystal device using an inorganic alignment layer, such as an obliquely deposited layer, and a method for fabricating the liquid crystal device.

2. Description of Related Art

In the related art, a liquid crystal device has a panel structure in which a pair of substrates have a liquid crystal layer therebetween. Electrodes disposed on the inner surfaces of the substrates apply voltage to the liquid crystal layer to control alignment of the liquid crystal by using the dielectric anisotropy and, therefore, a predetermined optical property is addressed or achieved by using the optical anisotropy of liquid crystal molecules. In this case, inner surfaces of the substrates in contact with the liquid crystal layer have alignment layers that determine the initial orientations of the liquid crystal molecules when no voltage is applied, as disclosed in related art document Japanese Unexamined Patent Application Publication No. 2000-137202.

For example, in liquid crystal devices having liquid crystal layers of the TN mode or the STN mode, the most typical type of the above-described alignment layer includes an organic alignment layer composed of a polymer, such as polyimide, whose surface is rubbed by a flocked cloth.

SUMMARY OF THE INVENTION

Unfortunately, since the organic alignment layer formed by rubbing is made from an organic polymer, it does not have sufficient light stability and heat resistance. In addition, a rubbing process produces dust particles, which disadvantageously cause variation in the alignment.

On the other hand, the related art includes a method using an inorganic alignment layer formed by an oblique evaporation, instead of the above-described organic alignment layer. In this oblique evaporation, as shown in FIG. 14, an inorganic material, such as SiO, is deposited onto a surface of a substrate 1 from an evaporation source 6 in the direction 6x oblique to the substrate 1 in a chamber 5 under reduced pressure. This method generates a plurality of columnar structures tilted towards a predetermined direction 1dx on the surface of the substrate 1 to form an obliquely deposited layer 1d.

The obliquely deposited layer 1d advantageously has high light stability and heat resistance, which are not provided by the organic alignment layer. Also, the obliquely deposited layer 1d eliminates the need for rubbing and, therefore, produces no dust particles. However, in general, the obliquely deposited layer tends to have a non-uniform alignment due to a weak anchoring (alignment-regulating) force. This disadvantageously decreases the contrast.

Accordingly, both organic alignment layer treated by rubbing and obliquely deposited layer formed by an oblique evaporation have a factor that causes alignment defects. Thus, display quality of liquid crystal displays composed of these liquid crystal devices has limitations.

Accordingly, an object of exemplary embodiments of the present invention is to provide a new structure of an alignment layer that reduces the alignment defects inherent in the alignment layer without changing the alignment layer itself.

To solve the above-mentioned and/or other problems, the repetitive considerations and experiments by the present inventor indicate that, in the case of an inorganic alignment layer composed of columnar structures tilted in a predetermined direction on a substrate, such as the above-described obliquely deposited layer, the ratio of the non-uniform alignment depends on an angular difference between a liquid crystal flow direction in a liquid crystal filling process and the above-described predetermined direction (tilt direction described below).

More specifically, with reference to FIG. 13, substrates 1 and 2 are bonded with a seal 3 therebetween to form a panel structure having a liquid crystal filling area partitioned by the seal 3. For example, in the liquid crystal filling process, liquid crystal 4 is introduced through a liquid crystal filling port 3a into the liquid crystal filling area. The liquid crystal 4 enters the liquid crystal filling area through the liquid crystal filling port 3a, and then flows in the various directions 4x while spreading over a surface of an alignment layer in the area. At this moment, if the flow direction 4x of the liquid crystal 4 is parallel to the above-described predetermined direction 1dx (at an angle of about 45 degrees with respect to a peripheral wall having the liquid crystal filling port 3a in FIG. 13), alignment defects considerably decrease. The alignment defects increase if the angle between the flow direction 4x and the predetermined direction 1dx is large.

In general, as shown in FIG. 13, the liquid crystal filling port 3a is disposed at the center of one of the side surfaces of the rectangular seal 3. Therefore, the front end of the flowing liquid crystal spreads while forming an arc shape, as shown in the drawing, and the flow directions 4x of the liquid crystal 4 distribute within about 180-degree angle range. Accordingly, as shown in the drawing, only part of the flow directions of the liquid crystal 4 spreading in a fan shape from the liquid crystal filling port 3a is parallel to the predetermined direction 1dx of the alignment layer, and most parts of the flow direction 4x of the liquid crystal 4 are not parallel to the predetermined direction 1dx. This results in the degradation of the contrast caused by alignment defects.

In addition, the predetermined direction 1dx is generally determined to be at an angle relative to the rectangular panel structure, as shown in FIG. 13. Therefore, the left part of a liquid crystal active area contains an area where the flow direction 4x is parallel to the predetermined direction 1dx, whereas the right part has a significant angular difference between the flow direction 4x and the predetermined direction 1dx. This may cause a large contrast difference between the two areas.

Accordingly, the present inventor has recognized that the problem is addressed or solved by controlling the flow direction of the liquid crystal in the liquid crystal filling area to be parallel to the predetermined direction of the alignment layer. This idea led to the following exemplary embodiments of the invention.

According to exemplary embodiments of the present invention, a method for fabricating a liquid crystal device is disclosed. The liquid crystal device includes a first substrate and a second substrate, liquid crystal therebetween, and an alignment layer on the inner surface of the first substrate, the alignment layer being in contact with the liquid crystal. The method includes forming the alignment layer including inorganic columnar structures tilted towards a predetermined direction on the substrate and filling a space between the pair of substrates with the liquid crystal towards the predetermined direction.

According to exemplary embodiments of the present invention, since liquid crystal is filled in the predetermined direction, the variation in alignment directions of liquid crystal molecules is reduced even if an anchoring force of the alignment layer is weak. Accordingly, an occurrence of alignment defects is reduced and variation in initial orientation of the liquid crystal molecules is reduced. In addition, since initial orientations of the liquid crystal molecules become uniform, excellent optical characteristics can be addressed or achieved. Herein, it is difficult to make the angular difference between the flow directions of the liquid crystal and the predetermined direction exactly zero. However, for example, the angular difference of less than or equal to 10 degrees over more than 80% of the liquid crystal filling area provides a sufficient effect.

In exemplary embodiments of the present invention, the alignment layer is preferably formed on an inner surface of each substrate and the liquid crystal is filled so as to flow on the alignment layer formed on one of the inner surfaces in a direction parallel to the predetermined direction. If an inorganic alignment layer in which columnar structures are tilted towards a predetermined direction is formed on the inner surface of each substrate, the predetermined direction of one alignment layer is generally different from that of the other alignment layer depending on a twist angle of the liquid crystal molecules. In this case, a flow direction of the liquid crystal parallel to either of the predetermined directions provides a sufficient effect. Herein, some of the liquid crystal may flow in a direction parallel to one predetermined direction in one area of the liquid crystal filling area and the other liquid crystal may flow in a direction parallel to the other predetermined directions in the other area of the liquid crystal filling area. However, by causing the liquid crystal to flow in one direction parallel to the predetermined direction of one alignment layer, as described above, the liquid crystal can flow in one direction over the entire liquid crystal filling area. This facilitates a liquid crystal filling process.

In exemplary embodiments of the present invention, the first substrate is preferably a device substrate on which active elements are formed. In general, the device substrate on which active elements are formed tends to have surface irregularities due to the active elements and wires required on the substrate. The experiments by the present inventor indicate that, in the case where a device substrate having relatively rough surface irregularities and a counter substrate having relatively fine surface irregularities are respectively disposed on both sides of a liquid crystal layer, a flow of the liquid crystal in a direction parallel to the predetermined direction of an alignment layer on the device substrate provides more effect than a flow of the liquid crystal in a direction parallel to the predetermined direction of an alignment layer on the counter substrate. This is because the rough surface irregularities reduce an anchoring force of the alignment layer at bumps where an adhesion of the alignment layer is impaired, and therefore, alignment defects tend to occur. However, the flow of the liquid crystal in a direction parallel to the predetermined direction of the alignment layer that has a weak anchoring force reduces the occurrence of the alignment defects caused by the weak anchoring force.

According to exemplary embodiments of the present invention, another method for fabricating a liquid crystal device is disclosed. The liquid crystal device includes a first substrate and a second substrate, liquid crystal therebetween, and an alignment layer on the inner surface of the first substrate, the alignment layer being in contact with the liquid crystal. The method includes forming the alignment layer including inorganic columnar structures tilted towards a predetermined direction on the first substrate; forming a seal on the first substrate or the second substrate, the seal having at least one discontinuity at a side intersecting the predetermined direction; bonding the pair of substrates with the seal to form a liquid crystal filling space enclosed by the seal; and filling the liquid crystal filling space with the liquid crystal through the discontinuity serving as a liquid crystal filling port.

According to exemplary embodiments of the present invention, a liquid crystal filling port is formed at a side of the seal intersecting the predetermined direction. Therefore, when the liquid crystal is introduced through the liquid crystal filling port, the flow direction of the liquid crystal is mainly parallel to the predetermined direction. Accordingly, an occurrence of alignment defects can be reduced, even if an anchoring force is weak. Herein, in order to make the flow direction parallel to the predetermined direction, the opening length of the liquid crystal filling port is preferably large. For example, the opening length is preferably greater than or equal to 15% of the length of the side wall. Ideally, the entire side of the liquid crystal filling area intersecting the predetermined direction is open, and the liquid crystal flows in through this liquid crystal filling port. However, in general, this structure has trouble maintaining spacing between the substrates at the liquid crystal filling port due to the wide liquid crystal filling port, and therefore, the thickness of the liquid crystal layer is non-uniform at the liquid crystal filling port. As a result, the opening length is preferably smaller than or equal to 30% of the length of the side wall.

Preferably, a plurality of the discontinuities is formed at a side intersecting the predetermined direction as liquid crystal filling ports and the liquid crystal is supplied through the liquid crystal filling ports. This structure, when the liquid crystal is introduced through the plurality of liquid crystal filling ports simultaneously, increases the total opening length. In addition, since pieces of the liquid crystal introduced through the liquid crystal filling ports restrict their flow directions with each other, most of the flow directions of the liquid crystal are substantially parallel to the predetermined direction. As a result, the occurrence of the alignment defects is more reduced. Furthermore, this structure can appropriately control the flow directions of the liquid crystal by changing a distance between the liquid crystal filling ports and opening lengths of the liquid crystal filling ports.

Preferably, the discontinuities are formed at a side of the seal that is perpendicular to the predetermined direction. In this case, the flow directions of the liquid crystal are more uniformly parallel to the predetermined direction. In particular, the side of the peripheral wall is preferably straight. Additionally, the flow directions of the liquid crystal can be more uniform by evenly forming a plurality of the liquid crystal filling ports (at even distances) in the entire side of the peripheral wall and giving the same opening length to the liquid crystal filling ports.

Preferably, the discontinuity is disposed at a corner of the seal and the liquid crystal is supplied through the corner as the liquid crystal filling port. In this structure, by forming a liquid crystal filling port at a corner of the seal and supplying the liquid crystal through the corner, the flow directions of the liquid crystal can be parallel to the predetermined direction even though the predetermined direction of the alignment layer is oblique to the peripheral wall.

Preferably, said at least one discontinuity includes two discontinuities, each is disposed in the vicinity of a corner of the seal, and the liquid crystal is supplied through the two discontinuities as liquid crystal filling ports. In this structure, by forming liquid crystal filling ports at two corners directed to the predetermined direction and introducing the liquid crystal therethrough, the liquid crystal can be introduced through a plurality of ports parallel to the predetermined direction. Therefore, the ratio of the flow directions parallel to the predetermined direction can be increased. Specifically, if, for example, the seal has a straight portion intersecting the predetermined direction, liquid crystal filling ports are formed at corners at both ends of the straight portion. This structure allows the liquid crystal to be introduced through these liquid crystal filling ports towards the predetermined direction.

Preferably, the two discontinuities of the seal are formed at both sides of a corner, respectively. In this case, by forming liquid crystal filling ports at both sides of a corner, since pieces of the liquid crystal introduced through the liquid crystal filling ports restrict their flow directions with each other, the flow directions of the liquid crystal can be more uniform. In addition, this structure can control the flow directions of the liquid crystal by changing a distance between the corner and each liquid crystal filling port and opening lengths of the liquid crystal filling ports. Accordingly, the flow directions can be more parallel to the predetermined direction regardless of the predetermined direction of the alignment layer relative to the extending direction of the seal. Therefore, variation in the flow directions is more reduced.

According to exemplary embodiments of the present invention, a liquid crystal device includes a first substrate and a second substrate bonded with a seal; liquid crystal between the pair of substrates; and an alignment layer on the inner surface of the first substrate, the alignment layer being in contact with the liquid crystal, wherein the alignment layer includes inorganic columnar structures tilted towards a predetermined direction on the substrate, the seal has at least one discontinuity serving as a liquid crystal filling port, and the liquid crystal filling port is directed to the predetermined direction.

In the liquid crystal device having the above-described structure, since the liquid crystal is supplied through the liquid crystal filling port in the predetermined direction, the ratio of alignment defects caused by a weak anchoring force decreases although an inorganic alignment layer composed of columnar structures tilted towards the predetermined direction is used. Typically, the alignment defects are reduced by more than or equal to 50% compared to the liquid crystal device shown in FIG. 13.

Preferably, the predetermined direction is perpendicular to a straight portion of the seal, the seal has the discontinuity serving as the liquid crystal filling port at a position of the straight portion, and the discontinuity is directed towards the predetermined direction.

Preferably, the seal further has a discontinuity serving as the liquid crystal filling port at a corner defined by two orthogonal straight portions, and the corner is directed towards the predetermined direction.

Preferably, the predetermined direction is oblique to a straight portion of the seal, the straight portion has a discontinuity serving as the liquid crystal filling port, and the discontinuity is directed to the predetermined direction.

Preferably, the predetermined direction is oblique to a straight portion of the seal, the seal has a discontinuity serving as the liquid crystal filling port at a corner defined by two orthogonal straight portions, and the corner is directed towards the predetermined direction.

Preferably, the predetermined direction is oblique to a straight portion of the seal, the seal has a corner defined by two orthogonal straight portions, the corner is directed towards the predetermined direction, and each portion has a discontinuity serving as the liquid crystal filling port in the vicinity of the corner.

Furthermore, according to exemplary embodiments of the present invention, an electronic apparatus includes one of the above-described liquid crystal devices to be used as a display unit. The liquid crystal device according to exemplary embodiments of the present invention is preferably used as, but not limited to, a display unit of an electronic apparatus. In particular, the liquid crystal device used in a projection display apparatus, such as a liquid crystal projector, or a mobile electronic information terminal including a mobile phone, can effectively exhibit the high display quality.

DETAILED DESCRIPTION OF PREFERRED EMBODIMENTS

Exemplary embodiments of the present invention will now be described in detail. The present invention, however, is not limited thereto. The exemplary embodiments will be described with reference to the accompanying drawings, in which the scaling of the layers and the other elements is appropriately altered from the actual one to enable them to be easily viewed.

First Exemplary Embodiment

Figure 3:
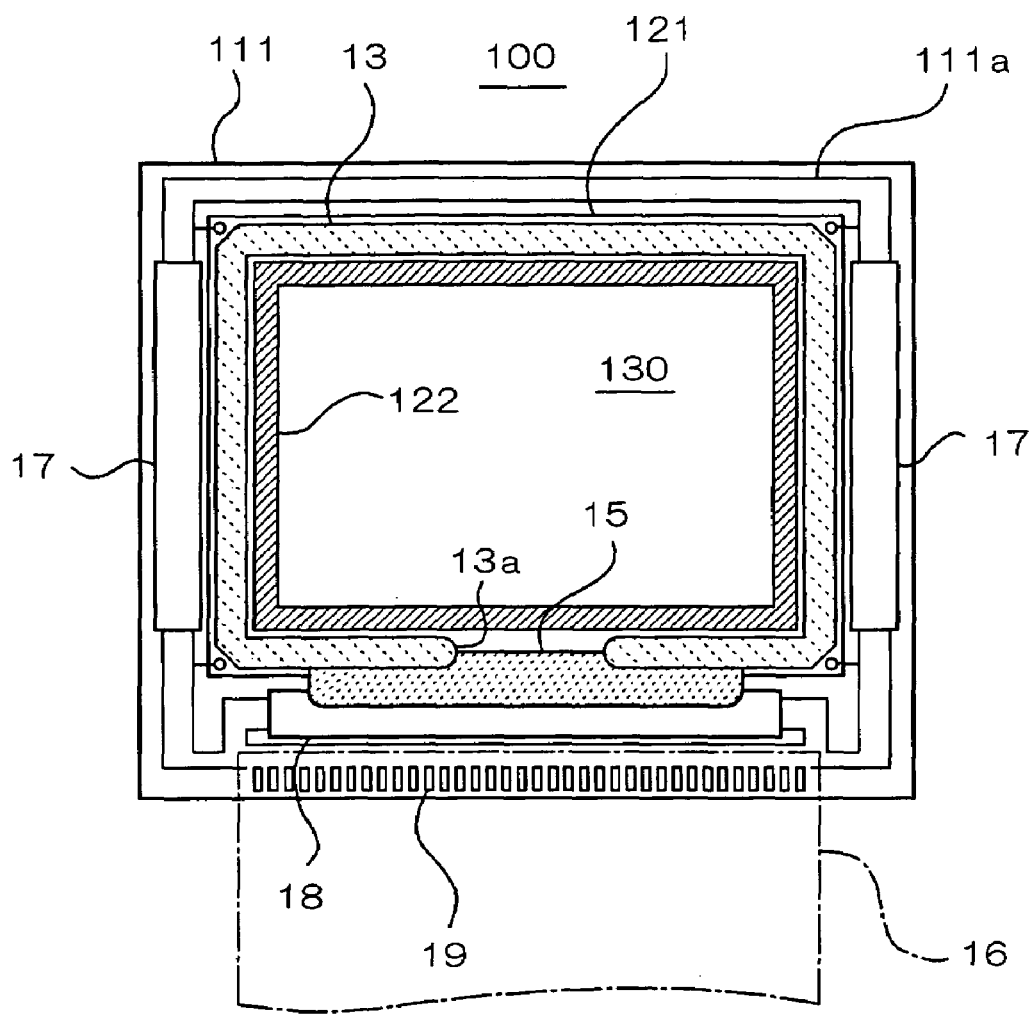
FIG. 3 is a schematic perspective plan view of a panel structure according to the first exemplary embodiment of the present invention.
Figure 4:
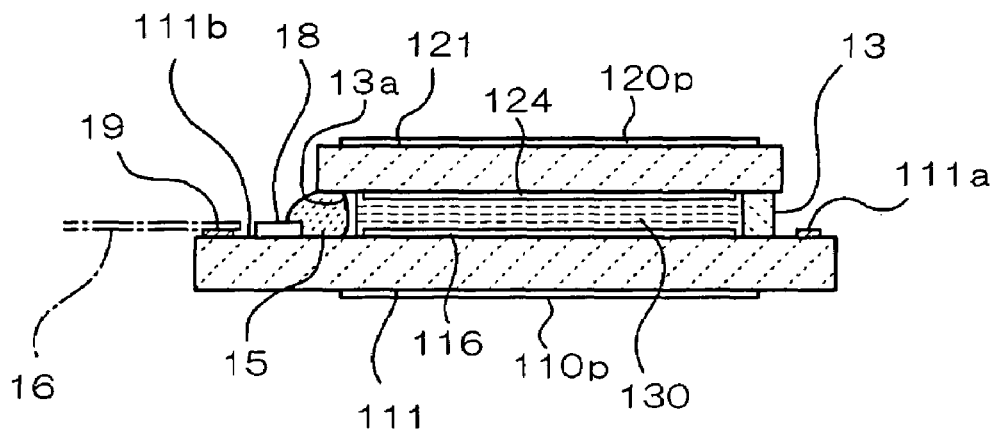
FIG. 4 is a schematic longitudinal section of the panel structure according to a first exemplary embodiment of the present invention.

A first exemplary embodiment of the present invention will be described below with reference to the accompanying drawings. First, a structure of a liquid crystal device 100 according to the exemplary embodiment will be described. FIG. 3 is a schematic perspective plan view of a panel structure of the liquid crystal device 100. FIG. 4 is a schematic longitudinal section of the panel structure.

With reference to FIGS. 3 and 4, the liquid crystal device 100 includes glass or plastic substrates 111 and 121 bonded with a seal 13 providing a predetermined spacing (cell gap) therebetween and liquid crystal 130 filled in a liquid crystal filling area partitioned by the seal 13. The liquid crystal 130 is filled through a liquid crystal filling port 13a formed in the seal 13, and the liquid crystal filling port 13a is then sealed with an end-sealing material 15, such as resin. The seal 13 may be made from light-curable resin, such as epoxy resin, or other types of resin. To maintain the cell gap, that is, spacing between the substrates or thickness of the liquid crystal layer, spacers (inorganic or organic fibers, or inorganic or organic balls) having the same diameter as the cell gap (about 2 to 10 mm) are preferably mixed in the seal 13.

The substrate 111 has a slightly larger surface area than the substrate 121. Active elements, such as wire layers, transparent electrodes, thin-film transistors (TFTs), and thin-film diodes (TFDs), corresponding to a plurality of pixels are formed on the inner surface of substrate 111 in the liquid crystal filling area. Also, wire layers and transparent electrodes corresponding to the plurality of pixels are formed on the inner surface of the substrate 121. On the inner surface of the substrate 121, a loop light shielding film 122 is also formed inside the seal 13 to surround a liquid crystal active area where the pixels are arranged.

A wire pattern 111a is formed on the inner surface of the substrate 111 outside the seal 13. The wire pattern 111a is conductively connected to the wire layers on the inner surfaces of the substrates 111 and 121. A scanning line driving circuit 17 and a data line driving circuit 18, which are composed of integrated circuit chips, are mounted along the wire pattern 111a. Furthermore, on one of the outer edges of the transparent substrate 111, an external terminal section 111b having a plurality of external terminals 19 is disposed. A wiring material 16, such as a flexible wiring board, is conductively connected to the external terminal section 111b via an anisotropic conductive film.

The liquid crystal 130 can be formed into a various types of liquid crystal layers, such as the TN type and the STN type, in which directions of liquid crystal molecules change by the dielectric anisotropy when an electric field is applied, and thus changes the optical property by the optical anisotropy. In the liquid crystal device 100, polarizing films, retardation films, or polarizing plates are attached in predetermined directions in accordance with the type of the liquid crystal 130, an operation mode, and a display mode (normally white or normally black). In FIG. 4, only polarizing plates 110p and 120p respectively attached to the outer surfaces of the substrates 111 and 121 are shown.

Figure 9:
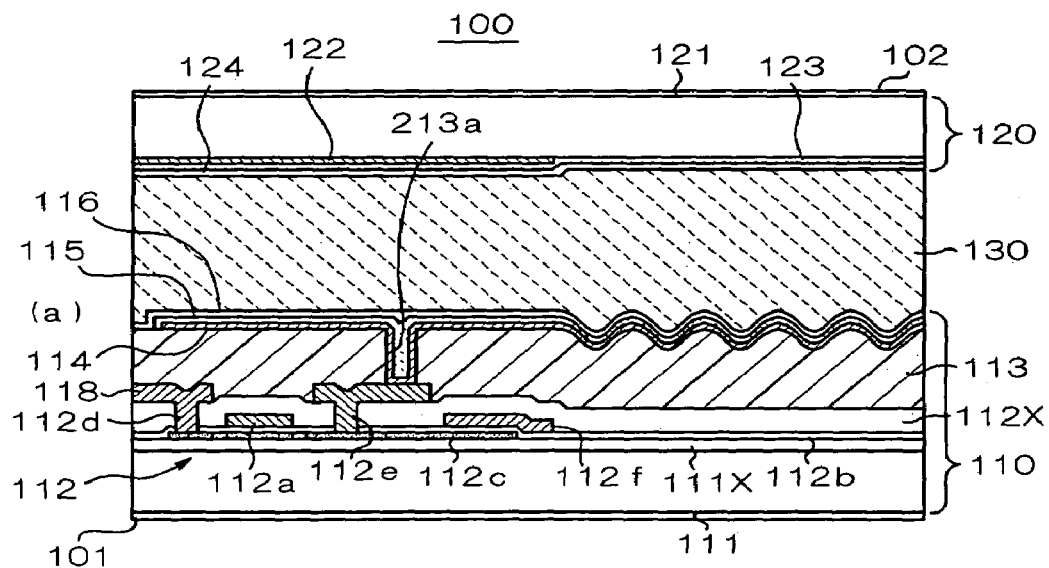
FIG. 9 is an enlarged schematic partial sectional view of the panel structure according to the first exemplary embodiment.
Figure 10:
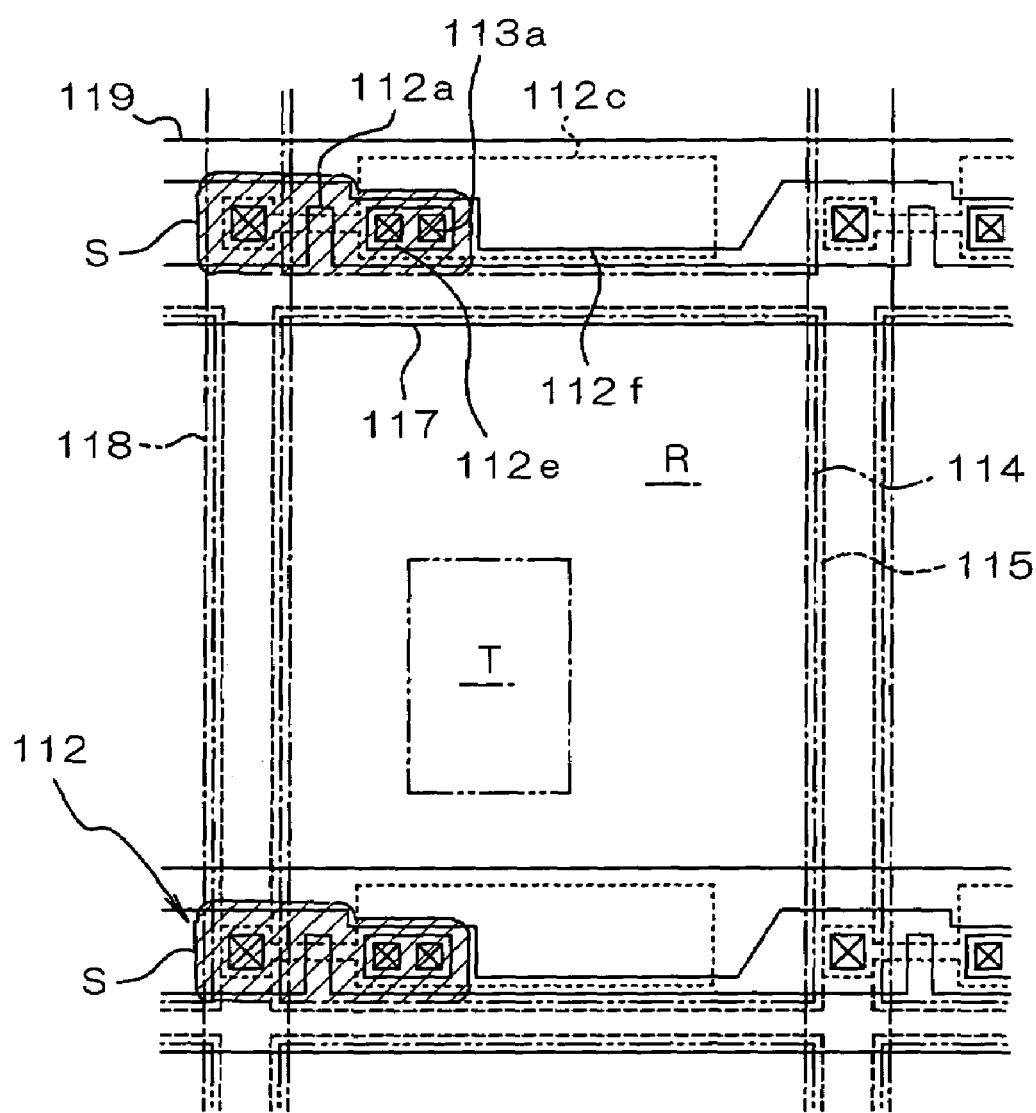
FIG. 10 is a schematic plan view of a device substrate used in the panel structure according to the first exemplary embodiment.

FIG. 9 is an enlarged schematic partial sectional view of an active matrix liquid crystal panel using TFTs in the liquid crystal device 100. FIG. 10 is a schematic plan view of a device substrate 110 used in this liquid crystal panel. As shown in FIG. 9, in the device substrate 110, TFTs 112 and pixel electrodes 115 are formed on the substrate 111. More specifically, a bedding insulating film 111X is formed on the substrate 111, and the TFTs 112 are formed on the bedding insulating film 111X. Each TFT 112 includes a Ta gate 112a, which is conductively connected to a scanning line 117, shown in FIG. 10; an $SiO_2$ insulating thin film 112b immediately beneath the gate 112a; and a polysilicon semiconductor layer 112c opposing the gate 112a with the insulating thin film 112b therebetween. An area of the semiconductor layer 112c opposing the gate 112a becomes a channel region, and a source region is formed on the left of the channel region in the drawing. The source region is connected to a source electrode 112d through an insulating interlayer 112X. A drain region is formed on the right of the channel region in the drawing. The drain region is connected to a drain electrode 112e through an insulating interlayer 112X.

As shown in FIG. 10, on the substrate 111, scanning lines 117 are transversely formed parallel to each other and data lines 118 are longitudinally formed parallel to each other. Each scanning line 117 is conductively connected to the gates 112a of the TFTs 112 of the pixels. Also, each data line 118 is conductively connected to the source electrodes 112d of the TFTs 112. The drain electrode 112e of the TFT 112 is electrically connected to the upper layer, i.e., a pixel electrode 115, through an opening 113a formed in an insulating layer 113. Additionally, the drain region of the semiconductor layer 112c is disposed at a position opposing a holding electrode 112f, which is part of a capacitive line 119 shown in FIG. 10, to form a holding capacitor between the drain region and the capacitor line 119.

The insulating layer 113 is made from synthetic resin, such as acrylate resin. The insulating layer 113 also covers the TFTs 112. On a surface of the insulating layer 113, a reflective layer 114 made from Al, Al alloy, Ag, or Ag alloy is formed. The reflective layer 114 follows tiny irregularities partly formed on the surface of the insulating layer 113 to form a diffuse reflective surface. On the reflective layer 114, the pixel electrode 115 made from a transparent conductive material, such as ITO, is formed. In this exemplary embodiment, as shown in FIG. 10, one pixel has a transparent region T where the pixel electrode 115 is formed, but not the reflective layer 114, and a reflective region R where both pixel electrode 115 and reflective layer 114 are formed. That is, the liquid crystal device 100 according to the exemplary embodiment is a transflective liquid crystal display device.

Figure 14:
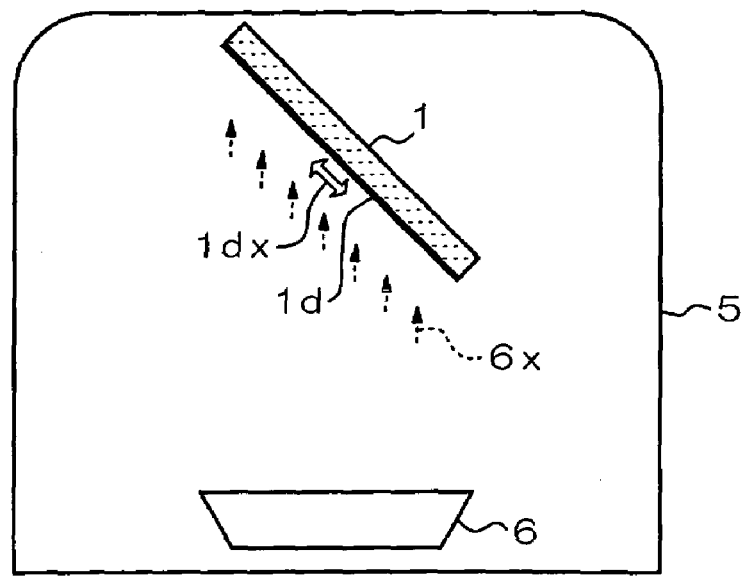
FIG. 14 is a diagram for explaining an oblique evaporation.

An alignment layer 116 is formed over the pixel electrode 115. This alignment layer 116 is preferably an inorganic alignment layer, in which columnar structures are arranged on a surface of the substrate 111 while being inclined with respect to the surface of the substrate 111 towards a predetermined direction. The alignment layer 116 can be formed as an obliquely deposited layer by an oblique evaporation shown in FIG. 14. An inorganic material that forms the alignment layer 116 includes SiO, $SiO_2$, SiN, MgO, and $MgF_2$. The deposition angle of the oblique evaporation is, for example, about 10 to 30 degrees with respect to the surface of the substrate, while the tilt angle of the above-described columnar structures is about 5 to 10 degrees with respect to the surface of the substrate. The thickness of the alignment layer 116, for example, ranges from about 50 to 300 angstroms.

On the other hand, elements, such as a counter electrode, are formed on the substrate 121 to form a counter substrate 120. Also, the above-described light shielding film 122 made from Cr or black resin is formed on the substrate 121. As shown in FIG. 3, the light shielding film 122 is formed at the periphery of the liquid crystal active area. In addition, the light shielding film 122 is formed in boundary areas between the pixels and in element-forming areas, where the TFTs 112 are formed, to enclose them. On the substrate 121, a counter electrode 123 made from a transparent conductive material, such as ITO, is also formed. On the counter electrode 123, an alignment layer 124 is formed. Like the above-described alignment layer 116, the alignment layer 124 may be an inorganic alignment layer, in which columnar structures are arranged on a surface of the substrate 121 while being inclined with respect to the surface of the substrate 121 towards a predetermined direction. Alternatively, the alignment layer 124 may be made from polymer, such as polyimide, and may be, for example, an oriented polymeric film treated by rubbing. In general, an initial alignment orientation of the liquid crystal 130 defined by the alignment layer 124 is different from an initial alignment orientation defined by the alignment layer 116. For example, when the liquid crystal 130 is formed into a liquid crystal layer of the TN mode, an angular difference between the initial alignment orientations of the two alignment layers is about 90 degree.

The device substrate 110 is bonded to the counter substrate 120 with a seal 13 therebetween, as shown in FIGS. 3 and 4, by pressure while maintaining a predetermined spacing between the substrates. At that time, spacers dispersed between the substrates and in the seal 13 control the spacing. Subsequently, a liquid crystal filling process is carried out to build the panel structure shown in FIGS. 3 and 4, as will be described below.

Figure 1:
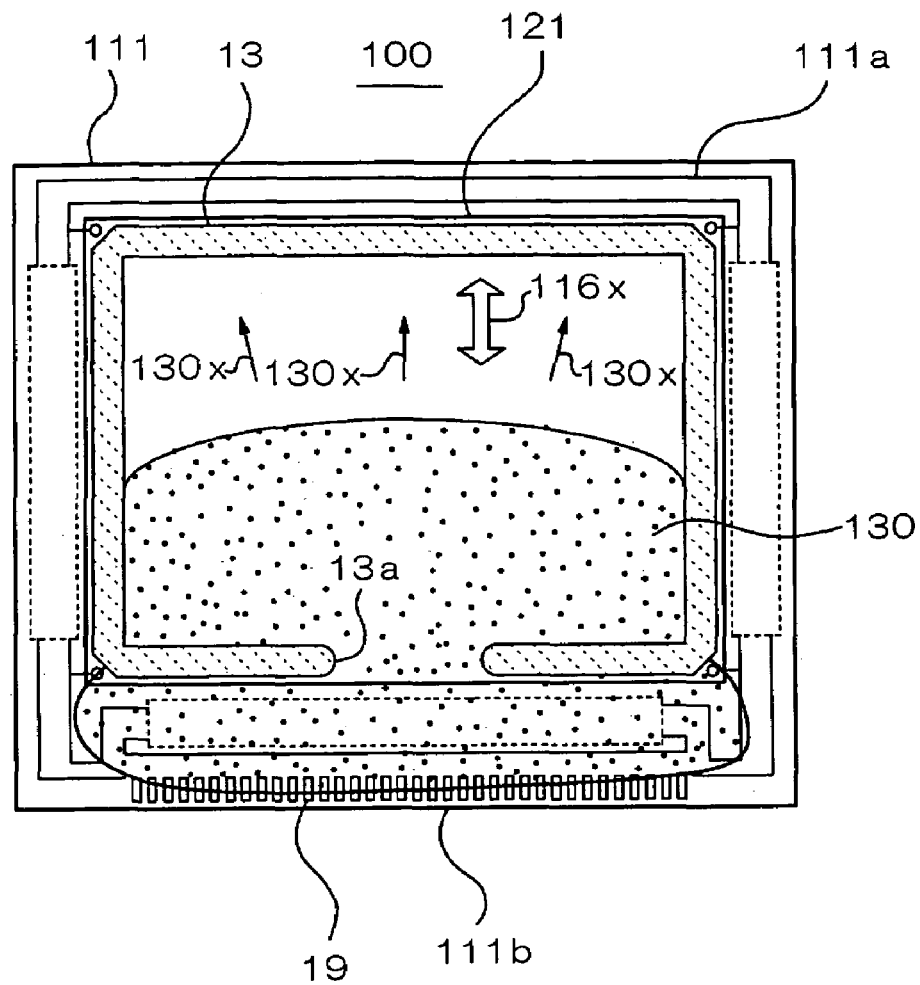
FIG. 1 is a schematic perspective plan view showing a liquid crystal filling process according to a first exemplary embodiment of the present invention.
Figure 2:
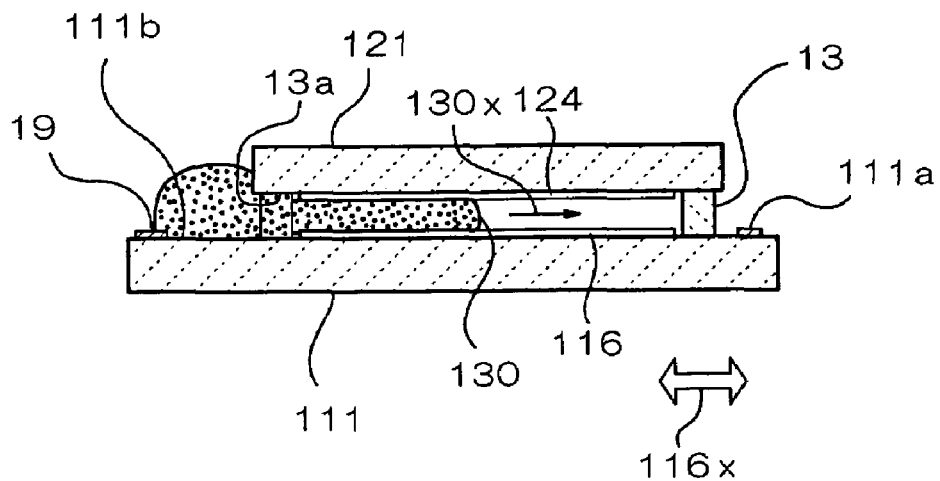
FIG. 2 is a schematic longitudinal section showing a liquid crystal filling process according to the first exemplary embodiment of the present invention.

FIG. 1 is a schematic perspective plan view of a panel structure of the liquid crystal device 100 in the filling process when the liquid crystal device 100 is fabricated. FIG. 2 is a schematic longitudinal section of the panel structure in the filling process. As shown in FIGS. 1 and 2, the liquid crystal device 100 described above is characterized in that the liquid crystal filling port 13*a* formed in the seal 13 is disposed on a side of the liquid crystal filling area intersecting the above-described predetermined direction 116*x* (hereinafter simply referred to as "tilt direction") of the alignment layer 116.

More specifically, a rectangular-frame peripheral wall composed of the seal 13 encloses the liquid crystal 130. The liquid crystal filling port 13*a* is formed at the center of one of the frame sides (long sides) of the peripheral wall. A filling direction of the liquid crystal 130 into the filling area through the liquid crystal filling port 13*a*, is parallel to the above-described tilt direction 116*x*. In addition, the liquid crystal filling port 13*a* occupies more opening space in the side of the peripheral wall than a known liquid crystal filling port. As the length of the opening space of the liquid crystal filling port 13*a* increases, flow directions 130*x* of the liquid crystal 130 become more parallel to the tilt direction 116*x*; however, variation in the cell gaps in the vicinity of the liquid crystal filling port 13*a* also increases. Therefore, the length of the opening space of the liquid crystal filling port 13*a* is preferably, for example, about 15% to 30% of the side (long side) of the peripheral wall.

Figure 5:
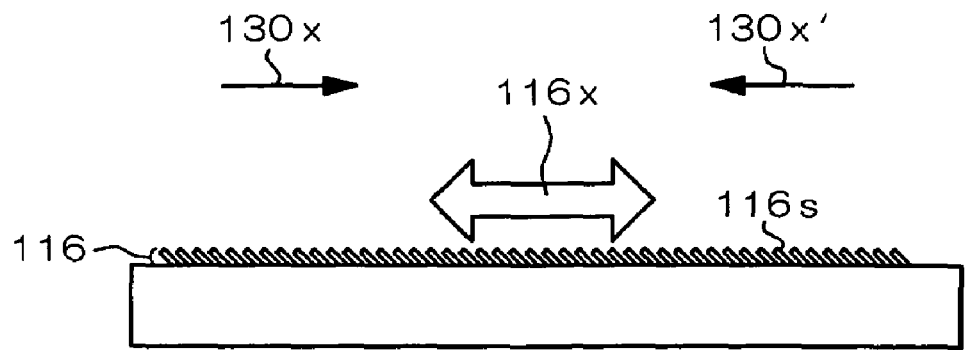
FIG. 5 is a schematic diagram showing the relationship among a structure of an alignment layer, its tilt direction, and flow directions of liquid crystal.

As used herein, the tilt direction 116*x* of the columnar structures 116*s* of the alignment layer 116 is referred to as a tilting and extending direction of the columnar structures 116*s* on the surface of the substrate viewed in plan, as shown in FIG. 5, and the tilt direction 116*x* is parallel to the surface of the substrate. Accordingly, in this exemplary embodiment, the liquid crystal filling port 13*a* is disposed on a side of the liquid crystal filling area where the liquid crystal 130 is filled, and the side intersects the above-described tilt direction 116*x*, as shown in FIGS. 1 and 2. More specifically, one of the sides (long sides) of the rectangular frame peripheral wall composed of the seal 13 is orthogonal to the tilt direction 116*x*. The liquid crystal filling port 13*a* is formed in this side of the peripheral wall.

In the liquid crystal filling process, for example, the panel structure having the empty liquid crystal filling area is disposed in a decompression chamber. The liquid crystal filling port 13*a* is then sealed with the liquid crystal 130 in an environment where pressure is reduced both inside and outside the panel structure. Subsequently, by increasing the pressure outside the panel structure, the liquid crystal 130 flows into the interior of the panel structure through the liquid crystal filling port 13*a* due to the pressure difference between inside and outside of the panel structure. Also, capillary phenomenon helps the liquid crystal 130 flow into the interior of the seal 13, and eventually the liquid crystal filling area, which is inside the peripheral wall composed of the seal 13, is filled with the liquid crystal 130. Thereafter, the liquid crystal filling port 13*a* is sealed. For example, the end-sealing material 15 made of light-curable resin is applied to the liquid crystal filling port 13*a*, which is sealed by curing the end-sealing material 15. During the sealing process, the panel structure is preferably under pressure to press two substrates by a pressure device.

Figure 13:
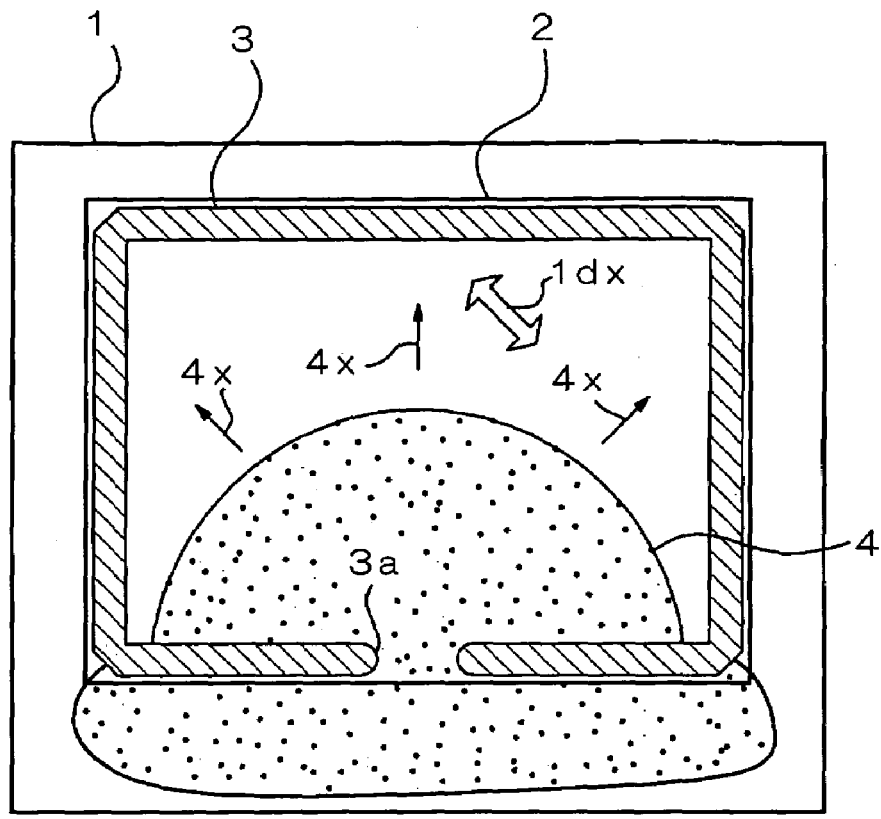
FIG. 13 is a schematic perspective plan view showing a liquid crystal filling process of a known panel structure.

In this exemplary embodiment, as shown in FIGS. 1 and 2, when the liquid crystal 130 is introduced into the liquid crystal filling area through the liquid crystal filling port 13*a* and flows on the alignment layer 116, the flow directions 130*x* of the liquid crystal 130 are distributed within a predetermined angle range on both sides of a direction substantially perpendicular to the side of the peripheral wall where the liquid crystal filling port 13*a* is formed. Most of the flow directions 130*x* in the liquid crystal active area (an area where optically controllable pixels are arranged) are substantially parallel to the tilt direction 116*x*. For example, in this exemplary embodiment, more than 80% of the flow directions 130*x* in the liquid crystal active area can be within an angular difference of 10 degrees with respect to the tilt direction 116*x*. This design of the exemplary embodiment significantly reduced the variation in initial alignment orientation of the liquid crystal 130 defined by the alignment layer 116. More specifically, according to the experiments of the present inventor, alignment defects of the panel structure shown in FIG. 13 were reduced by 30% or more. In addition, compared to a contrast of 300 provided by a panel structure shown in FIG. 13, the panel structure according to the exemplary embodiment, which has the same conditions except the tilt direction and the filling port, exhibited a contrast of about 500, which was a significant increase of the contrast.

As shown in FIG. 5, two flow directions 130*x* and 130*x'* of the liquid crystal 130, which are opposite to each other, are parallel to the tilt direction 116*x*. According to the experiments of the present inventor, both directions reduced the alignment defects in much the same way.

In this exemplary embodiment, the liquid crystal filling port 13*a* is formed in accordance with the tilt direction 116*x* of the alignment layer 116. When the alignment layer 124 is an inorganic alignment layer in which columnar structures are tilted towards a predetermined direction, as is the alignment layer 116, the liquid crystal filling port 13a may be formed in accordance with a tilt direction of the alignment layer 124. However, according to the experiments of the present inventor, the contrast is more increased when the liquid crystal 130 flows in a direction parallel to an tilt direction of an alignment layer formed on the device substrate 110, whose inner surface has relatively large irregularities (bumps), compared to the contrast when the liquid crystal 130 flows in a direction parallel to a tilt direction of the alignment layer 124 formed on the counter substrate 120, whose inner surface has relatively small irregularities (bumps). This is because the surface irregularities of the device substrate 110 impair an adhesive force of the alignment layer 116, and therefore, an anchoring force of the alignment layer 116 is reduced. Consequently, the alignment defects are more reduced by introducing the liquid crystal 130 in the direction parallel to the tilt direction 116x of the alignment layer 116 to compensate the weak anchoring force of the alignment layer 116.

Second Exemplary Embodiment

A liquid crystal device 200 according to a second exemplary embodiment of the present invention will be described next with reference to FIG. 6. Except for a seal 23 having different liquid crystal filling ports, the structures of other elements, such as substrates 211 and 221, liquid crystal 230, a wire pattern 211a, and an tilt direction 226x of an alignment layer, are identical to those in the first exemplary embodiment, and as such no further descriptions will be hereinafter provided.

Figure 6:
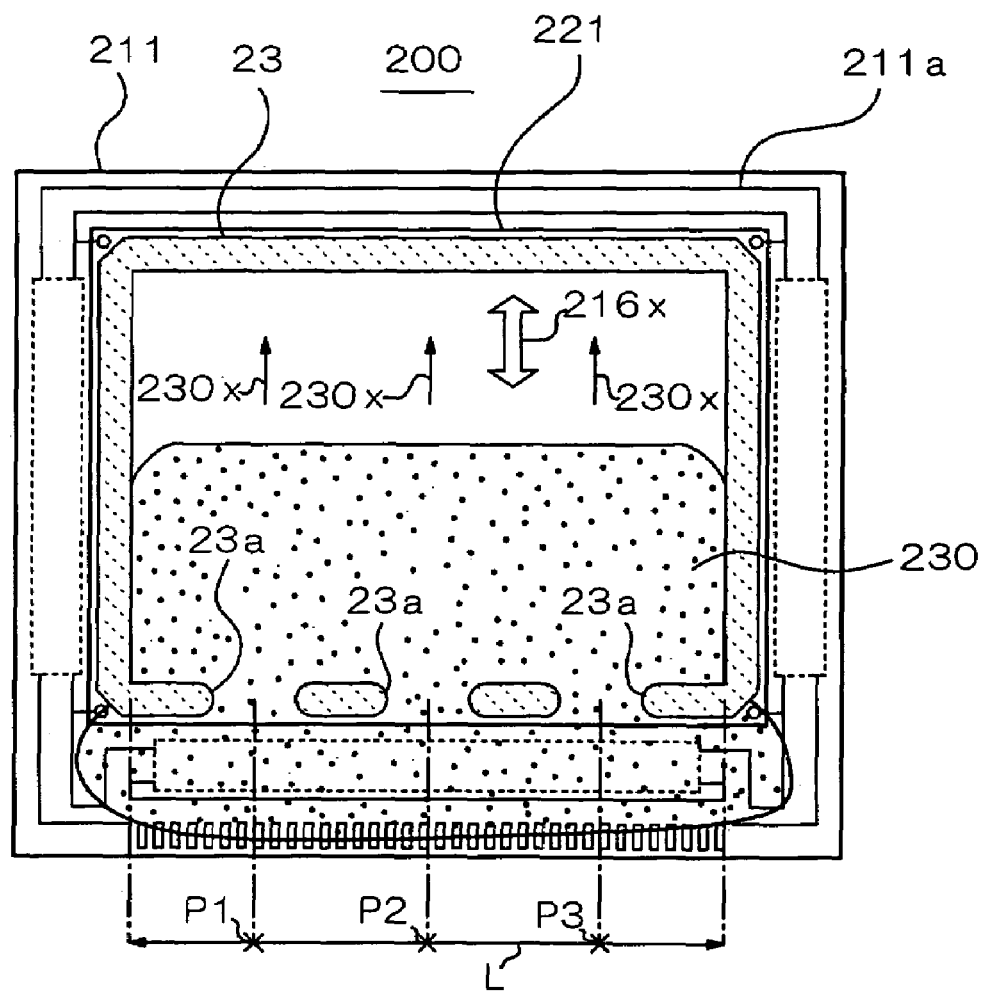
FIG. 6 is a schematic perspective plan view showing a liquid crystal filling process according to a second exemplary embodiment of the present invention.

This exemplary embodiment is characterized in that, as shown in FIG. 6, a plurality of liquid crystal filling ports 23a is formed in a seal 23. Specifically, a rectangular-frame peripheral wall composed of the seal 23 encloses the liquid crystal 230. The plurality of liquid crystal filling ports 23a is formed in one of the frame sides (long sides) of the peripheral wall. These liquid crystal filling ports 23a are distributed in the side to introduce liquid crystal evenly with respect to a length L of the side. More specifically, in this exemplary embodiment, all the liquid crystal filling ports 23a have the same opening length. These liquid crystal filling ports 23a are disposed such that central points P1, P2, and Pn of respective liquid crystal filling ports 23a coincide with central points of the lines which evenly divide the length L by the number of liquid crystal filling ports 23a. In the example in FIG. 6, central points of three liquid crystal filling ports 23a coincide with central points of three equally-spaced lines that divide the length of one side of the peripheral wall into six. Alternatively, the number of liquid crystal filling ports 23a may be two, or four or more.

In this exemplary embodiment, the liquid crystal filling ports 23a are disposed on a side of the liquid crystal filling area, where the liquid crystal 230 is filled, and the side intersects the above-described tilt direction 216x, as in the first exemplary embodiment. More specifically, one of the sides (long sides) of the rectangular frame peripheral wall composed of the seal 23 is orthogonal to the tilt direction 216x. The liquid crystal filling ports 23a are formed in this side of the peripheral wall.

In this exemplary embodiment, as shown in FIG. 6, pieces of the liquid crystal 230 are simultaneously introduced into the liquid crystal filling area through the plurality of liquid crystal filling ports 23a. Accordingly, the total opening length can be increased. In addition, since the pieces of the liquid crystal 230 introduced through the liquid crystal filling ports 23a restrict their flow directions with each other, all the flow directions of the liquid crystal 230 are substantially orthogonal to the side of the peripheral wall where the liquid crystal filling ports 23a are formed. As a result, in the liquid crystal filling process according to the exemplary embodiment, the liquid crystal 230 flows on the alignment layer in the direction parallel to the tilt direction 216x. Furthermore, although the total opening length is increased, variation in the cell gaps in the vicinity of the liquid crystal filling ports 23a can be decreased by forming such a plurality of the liquid crystal filling ports 23a.

In this exemplary embodiment, virtually all the liquid crystal 230 flows on the substrate 211 in the direction parallel to the tilt direction 216x. Therefore, alignment defects of the liquid crystal 230 can be further reduced. Specifically, compared to the panel structure shown in FIG. 13, the alignment defects were able to be reduced by more than 50%. Compared to the panel structure of a contrast of 500 according to the first exemplary embodiment, this structure exhibited a contrast of about 700 under the same conditions except for the number of filling ports and their locations.

Additionally, in this exemplary embodiment, in a side of a seal intersecting the predetermined direction, a plurality of liquid crystal filling ports are formed away from the corners at both ends of the side. However, for example, two liquid crystal filling ports may be formed on the corners at both ends of the side, respectively, and liquid crystal may be filled from the filling ports. Alternatively, when a liquid crystal filling port is formed in a side of a seal intersecting the predetermined direction, as in the first exemplary embodiment and this exemplary embodiment, the liquid crystal filling port may be formed on at least one of the corners at both ends of the side.

Third Exemplary Embodiment

Figure 7:
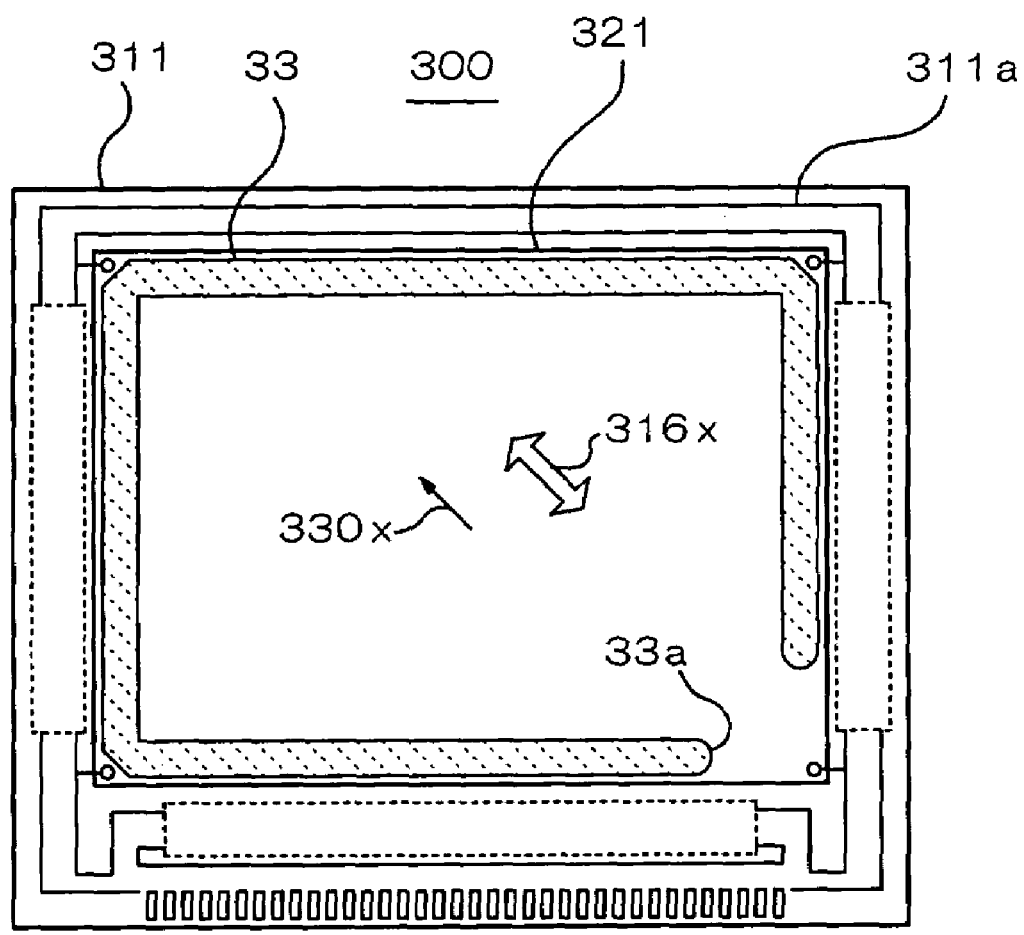
FIG. 7 is a schematic perspective plan view showing a liquid crystal filling process according to a third exemplary embodiment of the present invention.

A liquid crystal device 300 having a different structure according to a third exemplary embodiment of the present invention will be described next with reference to FIG. 7. As in the second exemplary embodiment, except for a location of a liquid crystal filling port 33a and a tilt direction 316x of an alignment layer on a substrate 311, the structures of other elements are identical to those in the first exemplary embodiment, and as such no further descriptions will be hereinafter provided.

In this exemplary embodiment, the tilt direction 316x of an alignment layer on the substrate 311 is oblique (at an angle of 45 degrees in the example shown in FIG. 7) to each side of a rectangular frame seal 33. The liquid crystal filling port 33a is disposed at a corner of a peripheral wall composed of the rectangular frame seal 33.

In this exemplary embodiment, since the liquid crystal filling port 33a is disposed at a corner of the peripheral wall, flow directions 330x of liquid crystal introduced into a liquid crystal filling area through the liquid crystal filling port 33a are distributed within a predetermined angle range on both sides of a direction parallel to the tilt direction 316x. Therefore, alignment defects are basically reduced as much as in the first exemplary embodiment.

Fourth Exemplary Embodiment

Figure 8:
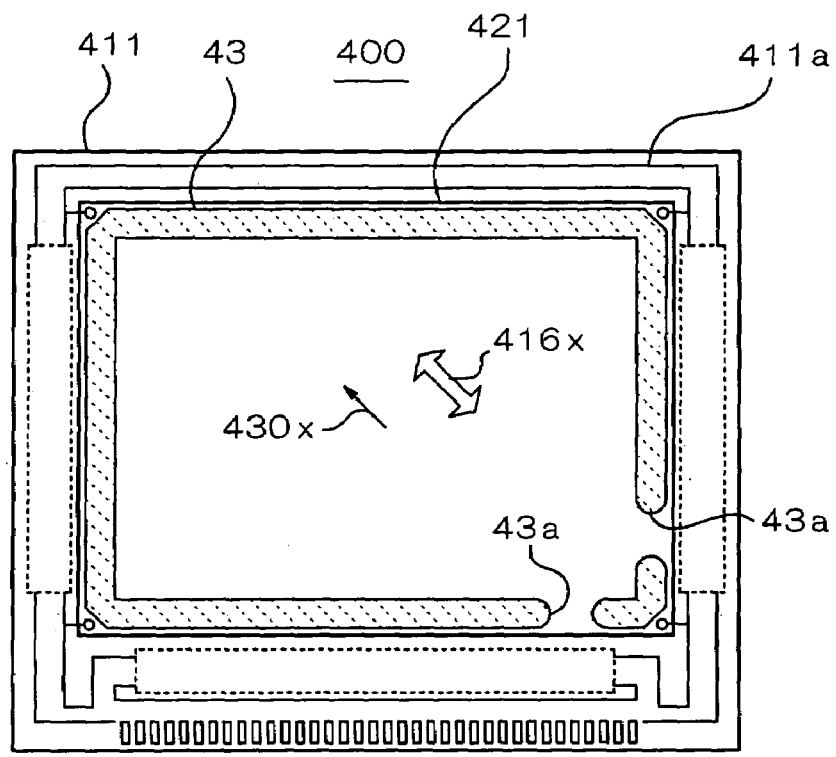
FIG. 8 is a schematic perspective plan view showing a liquid crystal filling process according to a fourth exemplary embodiment of the present invention.

A liquid crystal device 400 according to a fourth exemplary embodiment of the present invention will be described next with reference to FIG. 8. As in the second exemplary embodiment, except for locations of liquid crystal filling ports 43a and a tilt direction 416x of an alignment layer on a substrate 411, the structures of other elements are identical to those in the first exemplary embodiment, and as such no further descriptions will be hereinafter provided.

In this exemplary embodiment, the tilt direction 416x of an alignment layer on the substrate 411 is oblique (at an angle of 45 degrees in the example shown in FIG. 8) to each side of a rectangular frame seal 43. The liquid crystal filling ports 43a are respectively disposed on both sides of a corner of a peripheral wall composed of the rectangular frame seal 43.

In this exemplary embodiment, since the liquid crystal filling ports 43a are respectively disposed on both sides of a corner of a peripheral wall, flow directions 430x of liquid crystal introduced into a liquid crystal filling area through the liquid crystal filling ports 43a are distributed within a predetermined angle range on both sides of a direction parallel to the tilt direction 416x. In addition, since the total opening length of the liquid crystal filling ports 43a is increased and pieces of the liquid crystal introduced through the liquid crystal filling ports 43a restrict their flow directions with each other, more pieces of liquid crystal can flow in a direction parallel to the tilt direction 416x in a wider area than in the third exemplary embodiment. Therefore, the alignment defects can be more reduced than in the third exemplary embodiment.

Additionally, in this exemplary embodiment, although two liquid crystal filling ports 43a are respectively disposed on both sides of a corner of a peripheral wall, a plurality of liquid crystal filling ports 43a may be disposed on at least one side of the corner of the peripheral wall. This structure allows more pieces of liquid crystal to flow in a direction parallel to the tilt direction 416x in a wider area. In addition, the flow directions of the liquid crystal can be totally controlled by independently controlling the opening lengths of the liquid crystal filling ports 43a.

Additionally, although the liquid crystal filling ports 43a are respectively disposed on both sides of a corner of a peripheral wall in this exemplary embodiment, depending on the tilt direction 416x, the liquid crystal filling port 43a may be formed in a straight portion on only one side intersecting the tilt direction 416x.

Fifth Exemplary Embodiment

Finally, according to a fifth exemplary embodiment of the present invention, an electronic apparatus including an electro-optical device according to the above-described exemplary embodiments will be described next with reference to FIGS. 11 and 12. Although an electronic apparatus including the above-described liquid crystal device 100 as display means will be described in this exemplary embodiment, the liquid crystal devices according to other embodiments can be used.

Figure 11:
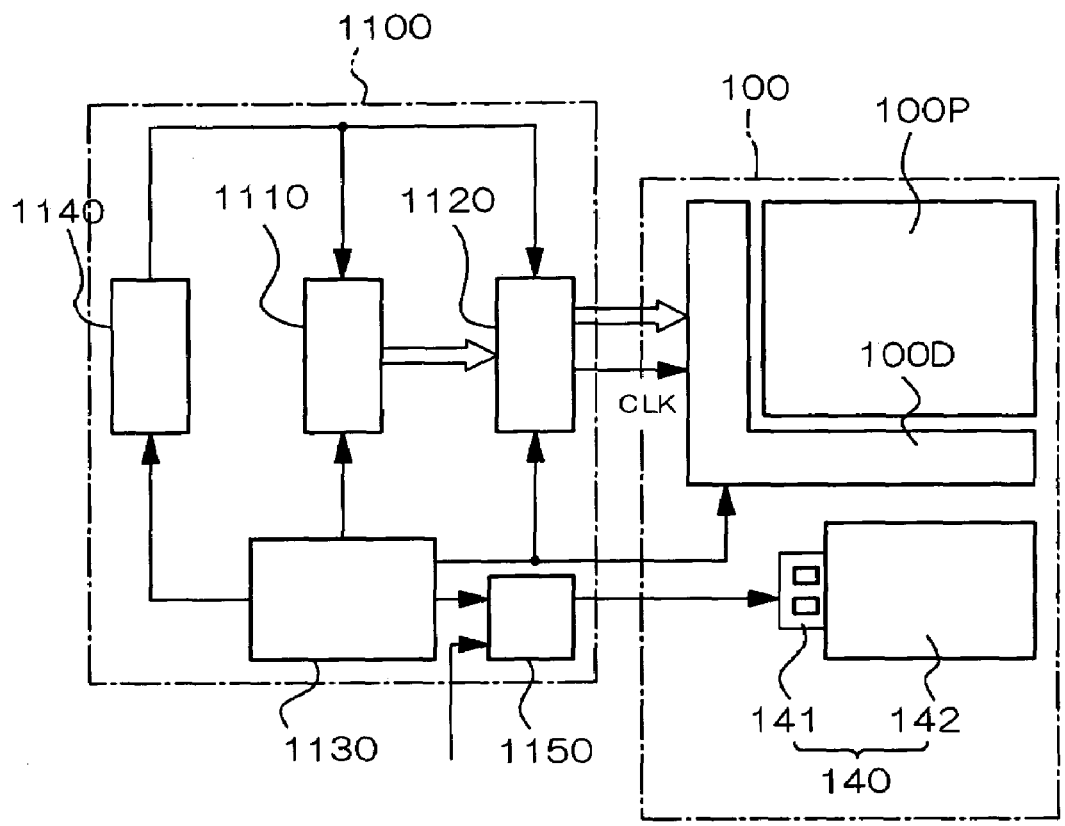
FIG. 11 is a schematic block diagram of an electronic apparatus.

FIG. 11 is a schematic block diagram of a control system (display control system) of the liquid crystal device 100 included in the electronic apparatus according to this exemplary embodiment. The electronic apparatus has a display control circuit 1100 that includes a display information source 1110, a display information processing circuit 1120, a power-supply circuit 1130, a timing generator 1140, and a light source control circuit 1150. The liquid crystal device (electro-optical device) 100 includes a liquid crystal display panel 100P having the above-described structure and a driving circuit 100D for driving the liquid crystal display panel 100P. The driving circuit 100D may include electronic components, such as semiconductor ICs, directly mounted on the liquid crystal display panel 100P, a circuit pattern formed on a surface of the panel, or a semiconductor IC chip or a circuit pattern mounted on a circuit board conductively connected to the liquid crystal panel. Also, the liquid crystal device 100 includes a backlight 140 on the back side of the liquid crystal display panel 100P.

The display information source 1110 has memories including a read only memory (ROM) and a random access memory (RAM), a storage unit including a magnetic recording disk and an optical recording disk, and a tuning circuit that synchronously outputs digital image signals. The display information source 1110 outputs displayed information as image signals in a predetermined format to the display information processing circuit 1120 based on various types of clock signals generated by the timing generator 1140.

The display information processing circuit 1120 includes various types of known circuits, such as a serial-parallel converter, an amplifying and inverting circuit, a rotation circuit, a gamma correction circuit, and a clamp circuit. The display information processing circuit 1120 processes input displayed information to deliver image information to the driving circuit 100D along with a clock signal CLK. The driving circuit 100D includes a scanning line driving circuit, a data line driving circuit, and a test circuit. The power-supply circuit 1130 supplies predetermined voltages to the above-described components.

The light source control circuit 1150 delivers electric power supplied by the power-supply circuit 1130 to a light source unit 141 of a backlight 140 based on an externally input control signal. Light emitted from the light source unit 141 is incident onto a light guide plate 142, which outputs the light to the liquid crystal display panel 100P. The light source control circuit 1150 controls to switch on or off each light source in the light source unit 141. The light source control circuit 1150 can also control the luminance of each light source.

Figure 12:
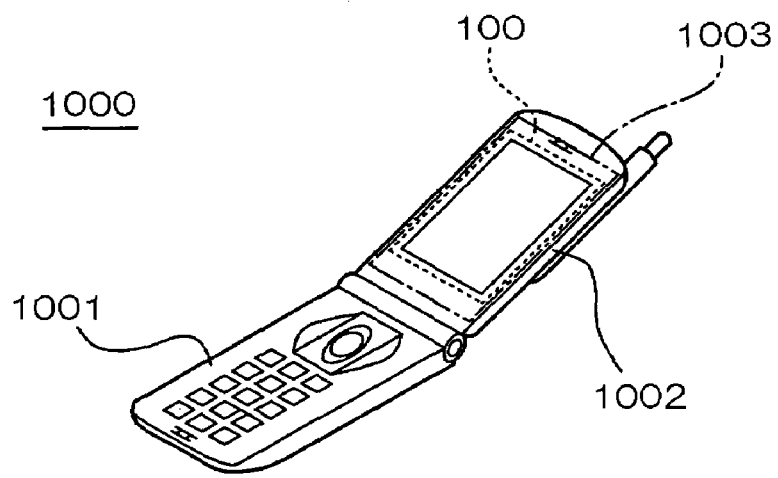
FIG. 12 is a schematic external perspective view of the electronic apparatus.

FIG. 12 is an external view of a mobile telephone, which is an exemplary embodiment of an electronic apparatus according to the present invention. An electronic apparatus 1000 includes an operation section 1001 and a display unit 1002. A circuit board 1003 is disposed inside a casing of the display unit 1002. On the circuit board 1003, the liquid crystal device 100 is mounted. Through a surface of the display unit 1002, a display screen of the liquid crystal display panel 100P can be viewed.

As described in the above-mentioned exemplary embodiments, the liquid crystal device according to the present invention can provide a significantly higher contrast than known structures, although the alignment layer itself is the same as a known alignment layer. The formed liquid crystal layer is apparently different from a known liquid crystal layer in that alignment defects are significantly decreased. Accordingly, electronic apparatuses that include this liquid crystal device as a display unit can also provide an advantage of significantly high display quality.

What is claimed is:

1. A liquid crystal device, comprising:
    a first substrate and a second substrate bonded with a seal;
    liquid crystal between the first and second substrates; and
    an alignment layer on an inner surface of the first substrate, the alignment layer being in contact with the liquid crystal,
    the alignment layer including inorganic columnar structures tilted towards a predetermined direction on the first substrate, the seal has at least one discontinuity serving as a liquid crystal filling port, and the liquid crystal filling port is directed to the predetermined direction, the predetermined direction being oblique to a straight portion of the seal, the seal has a corner defined by two connected orthogonal straight portions, the corner being directed towards the predetermined direction, and each portion has a discontinuity serving as a liquid crystal filling port in the vicinity of the corner.

2. A liquid crystal device, comprising:

a first substrate and a second substrate bonded with a seal;

liquid crystal between the first and second substrates; and an alignment layer on an inner surface of the first substrate, the alignment layer being in contact with the liquid crystal, the alignment layer including inorganic columnar structures tilted towards a predetermined direction on the first substrate, the seal has at least one discontinuity serving as a liquid crystal filling port, and the liquid crystal filling port is directed to the predetermined direction, the predetermined direction being oblique to a straight portion of the seal and the straight portion has a discontinuity serving as the liquid crystal filling port, the discontinuity being directed to the predetermined direction.

3. A liquid crystal device, comprising:

a first substrate and a second substrate bonded with a seal;

liquid crystal between the first and second substrates; and an alignment layer on an inner surface of the first substrate, the alignment layer being in contact with the liquid crystal, the alignment layer including inorganic columnar structures tilted towards a predetermined direction on the first substrate, the seal has at least one discontinuity serving as a liquid crystal filling port, and the liquid crystal filling port is directed to the predetermined direction, the predetermined direction being oblique to a straight portion of the seal, the seal has a discontinuity serving as the liquid crystal filling port at a corner defined by two orthogonal straight portions, the corner being directed towards the predetermined direction.

4. An electronic apparatus, comprising:

the liquid crystal device according to claim 1 to be used as a display unit.

* * * * *